United States Patent [19]

Chelberg

[11] 4,043,698
[45] Aug. 23, 1977

[54] DRILL ATTACHMENT

[76] Inventor: Rodney Chelberg, 11721 Excelsior Blvd., Hopkins, Minn. 55343

[21] Appl. No.: 738,244

[22] Filed: Nov. 2, 1976

[51] Int. Cl.² ............................................. B23B 51/00
[52] U.S. Cl. ................................ 408/201; 145/116 R; 408/82; 408/241 R
[58] Field of Search .................... 408/81, 82, 200, 201, 408/211, 225, 241, 703; 145/116 R; 144/219, 241

[56] References Cited
U.S. PATENT DOCUMENTS 413,316  10/1889  Dobson ................................ 408/201

Primary Examiner—Othell M. Simpson
Assistant Examiner—Z. R. Bilinsky

[57] ABSTRACT

A follower is provided for a conventional flat drill bit which adapts the drill bit to provide a diametrally enlarged bore. The follower generally comprises a cylindrical section having a diametral slot therein in which the blade end of the bit is received. The well-bottom of the diametral slot includes a tapered socket in which the nose of the bit is received, the nose of the bit extending beyond the bottom wall of the cylindrical section. A means is provided for releasably mounting the follower on the drill bit. A bore in the work piece to be drilled is initiated by the nose of the bit extending through the follower thereon. As the nose penetrates into the work piece, the follower diametrally enlarges the bore provided thereby.

3 Claims, 5 Drawing Figures

DRILL ATTACHMENT

BACKGROUND OF THE INVENTION

This invention relates generally to improvements in bits for drills, and more particularly to an adapter for a conventional flat bit for providing a widened drilled bore or for providing a widened countersunk bore therewith.

Heretofore, attachments have been provided for standard cylindrical bits for widening a drilled bore or providing a countersunk opening thereto. However, such attachments are unknown for flat bladed bits, or such attachments may be known for such bits are unsatisfactory or lack commercial potential.

SUMMARY OF THE INVENTION

Generally speaking, in accordance with the invention, a follower is provided for a conventional flat drill bit which adapts the drill bit to provide a diametrally enlarged bore. The follower generally comprises a cylindrical section having a diametral slot therein in which the blade end of the bit is received. The well-bottom of the diametral slot includes a tapered socket in which the nose of the bit is received, the nose of the bit extending beyond the bottom wall of the cylindrical section. A means is provided for releasably mounting the follower on the drill bit.

A bore in the work piece to be drilled is initiated by the nose of the bit extending through the follower thereon. As the nose penetrates into the work piece, the follower diametrally enlarges the bore provided thereby.

Accordingly, it is an object of the invention to provide a means for adapting a conventional flat drill bit to provide a diametrally enlarged bore.

Another object of the invention is to provide a follower for a conventional flat drill bit which diametrally enlarges the bore provided thereby.

A further object of the invention is to provide a follower that may be releasably mounted on a flat drill bit to enlarge the bore usually provided thereby.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWING

For a fuller understanding of the invention, reference is had to the following description taken in conjunction with the accompanying drawing, in which.

DETAILED DESCRIPTION OF THE INVENTION

Figure 1:
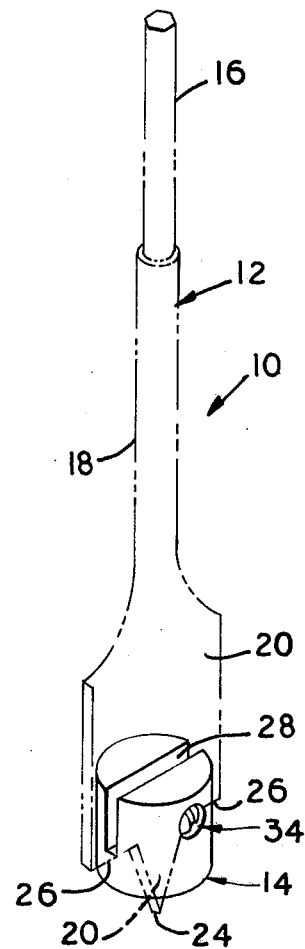
FIG. 1 is a perspective view of follower constructed according to the invention, as operatively mounted on a conventional flat drill bit.

Referring now to the drawing, the bit and follower assembly generally numbered 10 is best seen in FIG. 1, and includes a conventional flat bit 12 mounted in a follower 14. The bit 12 includes a stock or shank 16 releasably mounted in the brace provided in a conventional drill, a bit stem 18 issuing downwardly from the shank 16 and having a paddle blade 20 connected thereto, the bit blade 20 having an axially extending nose 22 depending therefrom.

As best seen in FIG. 1 nose 22 is tapered to a cutting point 24, which initiates the bore when the bit 12 is actuated. The nose 22 issues downwardly from a substantially linear edge 26 of paddle blade 20.

Figure 2:
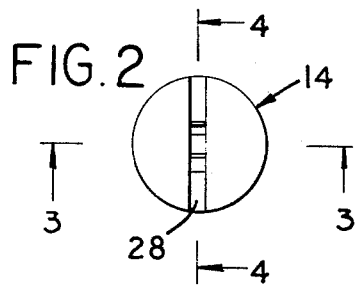
FIG. 2 is a cross-sectional view taken through the follower embodiment seen in FIG. 1.
Figure 4:
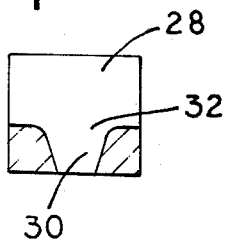
FIG. 4 is a sectional view taken along line 4—4 of FIG. 2.

The follower 14 generally comprises a cylindrical section, as seen in FIGS. 1 and 2, having an axially extending diametral slot 28 therein, which provides a seat for the linear edge 26 of the paddle blade 20, and the paddle blade 20 is matingly engaged therein. An axially extending tapered socket 30, best seen in FIG. 4 is provided in the well-bottom 32 of slot 28 in follower 14.

Figure 5:
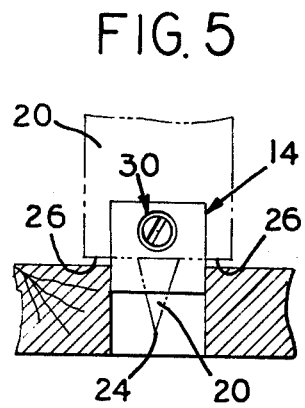
FIG. 5 is a detail view showing the mode of operation of the follower constructed according to the invention.

The taper in socket 30 corresponds to the taper of nose 22, and nose 22 is registrable therein when follower 14 is mounted on bit 12. As best seen in FIG. 5, the nose 22 extends through socket 30 when the bit 12 is operatively mounted on the follower 14.

Figure 3:
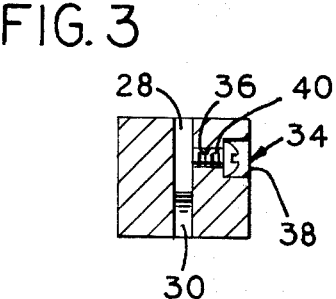
FIG. 3 is a sectional view taken along line 3—3 of FIG. 2.

The follower 14 is releasably mountable on the paddle blade 20, for instance by means of a slot and set screw arrangement generally numbered 34. An interiorly threaded radial aperture 36 having an enlarged entranceway 38 is provided in the side wall of follower 14 at a substantial perpendicular to slot 28 therein. A headed set screw 40 is threadable into aperture 36, and may releasably fix the follower 14 on the bit 12, as best seen in FIG. 3.

The mode and manner of operation of the invention may be seen with reference to FIG. 5. The work piece is initially bored by the nose 22, then by the follower 14 as the depth of the nose 22 increases in the work piece.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A boring follower for a standard flat drill bit of the type having a shank mountable in a drill brace, a bit stem issuing therefrom and having a substantially flat paddle blade connected thereto including an axially extending tapered cutting nose, said boring follower comprising a cylindrical section having an axially extending diametral slot therein, said paddle blade of said bit being matingly engageable in said diametral slot, said diametral slot terminating in a radially extending well-bottom in said follower, an axially extending tapered socket in said well-bottom said tapered socket extending through said follower, said socket having a taper corresponding to said taper of said nose of said paddle blade, said nose of said paddle blade being registrable in said tapered socket, and means releasably fixing said follower on said paddle blade.

2. The boring follower as claimed in claim 1, said means comprising a threaded radial aperture in said follower, and a set screw threadable therein, said set screw being engageable against said paddle blade for releasably fixing the position thereof.

3. The boring follower as claimed in claim 2, said threaded radial aperture in said follower being substantially perpendicular to said diametral slot in said follower.

* * * * *